United States Patent
Nagano

(10) Patent No.: US 11,223,288 B2
(45) Date of Patent: Jan. 11, 2022

(54) BIPOLAR CURRENT CONTROL DRIVE CIRCUIT FOR INDUCTIVE LOAD

(71) Applicant: YUKEN KOGYO CO., LTD., Ayase (JP)

(72) Inventor: Taku Nagano, Yokosuka (JP)

(73) Assignee: YUKEN KOGYO CO., LTD., Ayase (JP)

( * ) Notice: Subject to any disclaimer, the term of this patent is extended or adjusted under 35 U.S.C. 154(b) by 689 days.

(21) Appl. No.: 16/307,370

(22) PCT Filed: May 8, 2018

(86) PCT No.: PCT/JP2018/017769
§ 371 (c)(1),
(2) Date: Dec. 5, 2018

(87) PCT Pub. No.: WO2019/150595
PCT Pub. Date: Aug. 8, 2019

(65) Prior Publication Data
US 2021/0013810 A1    Jan. 14, 2021

(30) Foreign Application Priority Data
Feb. 1, 2018 (JP) .............................. JP2018-016419

(51) Int. Cl.
*H02M 3/335* (2006.01)
*H02P 7/03* (2016.01)

(52) U.S. Cl.
CPC .......... *H02M 3/33576* (2013.01); *H02P 7/05* (2016.02)

(58) Field of Classification Search
CPC ............. H02M 3/335; H02M 3/33507; H02M 3/33569; H02M 3/33576; H02M 3/33592
See application file for complete search history.

(56) References Cited

U.S. PATENT DOCUMENTS

| 4,870,555 A * | 9/1989 | White ............... H02M 3/33592 363/21.06 |
| 7,567,443 B2 * | 7/2009 | Shiga ................ H02M 3/3376 363/17 |
| 9,964,125 B2 | 5/2018 | Goldfarb et al. |

FOREIGN PATENT DOCUMENTS

| CN | 102437772 A | 5/2012 |
| CN | 103618470 A | 3/2014 |

(Continued)

OTHER PUBLICATIONS

PCT/ISA/237, "Written Opinion of the International Searching Authority for International Application No. PCT/JP2018/017769," dated Jul. 3, 2018.

(Continued)

*Primary Examiner* — Gary L Laxton
(74) *Attorney, Agent, or Firm* — Manabu Kanesaka

(57) ABSTRACT

A bipolar current control drive circuit for an inductive load includes a switching power supply circuit in which an alternating current from a power supply is formed to a direct current smoothed through a rectifier bridge diode and a primary smoothing capacitor, the current is transmitted to a secondary side using a switching transformer, and the current is formed to a direct current. The switching transformer includes a first secondary coil and a second secondary coil for one primary coil to form alternating currents from the secondary coils to direct currents in reverse orientations and output the currents to an inductive load. A polarity control circuit controls switching between closing and opening of a first secondary switching element and a second secondary switching element and controls the polarity of an electric current.

6 Claims, 2 Drawing Sheets

(56) References Cited

FOREIGN PATENT DOCUMENTS

| JP | H07-194142 A | 7/1995 |
|---|---|---|
| JP | H10-210754 A | 8/1998 |
| JP | 2000-184713 A | 6/2000 |
| JP | 2001-203088 A | 7/2001 |
| JP | 2006-014392 A | 1/2006 |
| JP | 2007-021336 A | 2/2007 |
| JP | 2008-043042 A | 2/2008 |
| JP | 2016-508205 A | 3/2016 |
| JP | 6262835 B1 | 1/2018 |
| WO | 2013/038963 A1 | 3/2013 |

OTHER PUBLICATIONS

PCT/ISA/210, "International Search Report for International Application No. PCT/JP2018/017769," dated Jul. 3, 2018.
Japanese Office Action; JP2018-016419 dated Nov. 7, 2018.
PCT/IB/310, "Notification concerning documents transmitted for International Application No. PCT/JP2018/017769," dated Jan. 18, 2019.
Europe Patent Office, "Search Report for European Patent Application No. 18793350.2," dated Jan. 2, 2020.
PCT/IB/338, "Notification of Transmittal of Translation of the International Preliminary Report on Patentability tor International Application No. PCT/JP2018/017769," dated Aug. 13, 2020.
PCT/IB/373, "International Preliminary Report on Patentability for International Application No. PCT/JP2018/017769," dated Aug. 4, 2020.

* cited by examiner

BIPOLAR CURRENT CONTROL DRIVE CIRCUIT FOR INDUCTIVE LOAD

RELATED APPLICATIONS

The present application is National Phase of International Application No. PCT/JP2018/017769 filed May 8, 2018, and claims priority from Japanese Application No. 2018-016419, filed Feb. 1, 2018, the disclosure of which is hereby incorporated by reference herein in its entirety.

TECHNICAL FIELD

The present invention relates to a bipolar current control drive circuit that can more efficiently control the driving direction of an inductive load including a motor, a linear motor, and a solenoid, for example, by appropriately controlling the direction of an electric current to the inductive load.

BACKGROUND ART

Conventionally, an H-bridge circuit is used in drive circuits that need bipolar control of supplying an electric current to an inductive load e.g. switching between forward rotation and reverse rotation of a motor and switching between directions of linear reciprocating motion of a solenoid.

The H-bridge circuit has a configuration in which four switching elements, such as field effect transistors (FETs), are connected to each other across a load and closing and opening of these four elements are selectively controlled to reverse the direction of an electric current carried to the load.

In a drive circuit having such an H-bridge configuration, in the case in which the bipolar current control of an inductive load is performed through proportional action elements in serial connection to the load, this control has a large heat loss, and is not practical, because the control is performed based on power loss. Therefore, under present circumstances, the mainstream of control is to perform efficient control over the load by pulse width modulation (PWM) control (e.g. see Patent Literature 1, Patent Literature 2, and Patent Literature 3).

CITATION LIST

Patent Literature

Patent Literature 1: Japanese Unexamined Patent Application Publication No. 2004-80929
Patent Literature 2: Japanese Unexamined Patent Application Publication No. 2009-296850
Patent Literature 3: Japanese Unexamined Patent Application Publication No. 2015-226367

SUMMARY OF INVENTION

Technical Problem

However, in the PWM control of the H-bridge configuration in bipolar current control, since the voltage across the load is a switched voltage, noise is large. In the case in which the load is a capacitive load, the loss is large. In the case in which the load is a linear motor, a spike current in a PWM cycle is generated in the magnetic circuit of the motor, and this causes losses and noise even though the capacitance is small.

In the case in which an inductive load is subjected to switching drive by high-frequency PWM, the magnetic field is changed every time when a voltage is supplied to the load. An electric current that interferes with a change in the magnetic field is generated on surrounding conductors, and an electric current that charges the capacitance of the load is carried at the same time. However, these electric currents make no contributions to driving the load, resulting in losses. Such a change in the magnetic field of the high frequency and a change in the voltage cause noise also from the load and power transmission cables.

When the power supply voltage is increased in order to accelerate the operation of the load, such as a motor, noise and losses are further increased. In addition to this, in the H-bridge circuit, a control element inserted between the power supply and the load performs control. Thus, the voltage to be applied to the load has the upper limit that is a power supply voltage, and the drive voltage depends on the power supply voltage. Therefore, a scheme is also considered with which the load impedance is decreased to increase the electric current for acceleration. However, in the case in which the transmission distance is long, a loss in wires is a problem.

The H-bridge circuit needs at least one element that determines the polarity and two elements that determine the amplitude. Of course, paired elements have to be prevented from being closed at the same time, as this causes a short circuit with a large current, resulting in the breakdown of the elements and damage to the circuit. This requires two circuits for on-timing control, causing a complicated circuit configuration because of the additional circuits.

In consideration of the problems, an object of the present invention is to provide a drive circuit that has a simple circuit configuration without adopting any H-bridge configuration, and at the same time, can perform more efficient bipolar current control of an inductive load, with losses and noise excellently reduced, as a drive circuit that performs the bipolar current control of the inductive load.

Solution to Problem

In order to achieve the object, a bipolar current control drive circuit for an inductive load of an invention according to claim 1 includes a switching power supply circuit and a control circuit.

The switching power supply circuit has
a rectifier bridge diode configured to rectify an alternating current from a power supply,
a primary smoothing capacitor configured to smooth a rectified direct current,
a switching transformer configured to transform a pulse wave alternating current at a predetermined alternating voltage and transmit the pulse wave alternating current to a secondary side, the pulse wave alternating current being converted from the direct current smoothed at the primary smoothing capacitor by switching between closing and opening of a primary switching element in a period based on a pulse signal from a pulse signal generator,
a secondary diode configured to rectify the alternating current transmitted to the secondary side, and
a secondary smoothing capacitor configured to further smooth the rectified direct current and output the rectified direct current that is smoothed to an inductive load.

The control circuit is configured to adjust a pulse duration of a pulse signal from the pulse signal generator based on a command signal and a detected result on an output side of the switching power supply circuit and control switching between closing and opening of the switching element.

The switching transformer includes one primary coil and two secondary coils that are a first secondary coil and a second secondary coil for the one primary coil.

A first secondary circuit and a second secondary circuit are provided, the first secondary circuit is configured to output, to the inductive load, a direct current resulted from an alternating current from the first secondary coil, the alternating current having been rectified at a first secondary diode and smoothed at a first secondary smoothing capacitor, and the second secondary circuit is configured to output, to the inductive load in a reverse orientation to an output orientation of the first secondary circuit, a direct current resulted from an alternating current from the second secondary coil, the alternating current having been rectified at a second secondary diode and smoothed at a second secondary smoothing capacitor.

On the first secondary circuit and the second secondary circuit, a first secondary switching element and a second secondary switching element are respectively placed.

The control circuit further has a polarity control circuit configured to control switching between closing and opening of the first secondary switching element and the second secondary switching element using a polarity signal based on the command signal and control a polarity of an electric current by selectably outputting, to the inductive load, an electric current from the first secondary circuit and an electric current from the second secondary circuit.

In the bipolar current control drive circuit according to claim 1, in a bipolar current control drive circuit for an inductive load of an invention according to claim 2, the inductive load includes a first inductive load and a second inductive load having driving directions opposite to each other, the first secondary circuit supplies an electric current to the first inductive load, and the second secondary circuit supplies an electric current to the second inductive load.

In the bipolar current control drive circuit according to claim 2, in a bipolar current control drive circuit for an inductive load of an invention according to claim 3, the inductive load has a double solenoid configuration, and the inductive load includes a pair of solenoids opposed to each other as the first inductive load and the second inductive load.

In the bipolar current control drive circuit according to claim 1, in a bipolar current control drive circuit for an inductive load of an invention according to claim 4, the first secondary circuit and the second secondary circuit have a high-side switch configuration in which the first secondary switching element and the second secondary switching element are placed at positions at which a high-voltage side line on the power supply side is connected to and disconnected from the inductive load.

In the bipolar current control drive circuit according to claim 1, in a bipolar current control drive circuit for an inductive load of an invention according to claim 5, the first secondary circuit and the second secondary circuit have a low-side switch configuration in which the first secondary switching element and the second secondary switching element are placed at positions at which a low-voltage side line is connected to and disconnected from the inductive load.

In the bipolar current control drive circuit according to claim 1, in a bipolar current control drive circuit for an inductive load of an invention according to claim 6, the polarity control circuit has a proportional switching configuration in which electric current switching is performed by controlling a degree of opening of the first secondary switching element of the first secondary circuit and a degree of opening of the second secondary switching element of the second secondary circuit proportional to a control deviation in inversely proportional relationship.

Advantageous Effects of Invention

The bipolar current control drive circuit for an inductive load according to the present invention includes the switching transformer, the main components of bipolar current control are accomplished by one shared switching element that determines the amplitude on the primary side and two switching elements that determine the polarity on the secondary side for the one shared switching element. And in the configuration of the bipolar current control drive circuit, a voltage rectified and smoothed on the secondary side with no switching is supplied to the inductive load. Thus, the configuration is simple without adopting any H-bridge configuration, and at the same time, more efficient bipolar current control of the inductive load is enabled with noise and losses excellently reduced.

DESCRIPTION OF EMBODIMENTS

Figure 1:
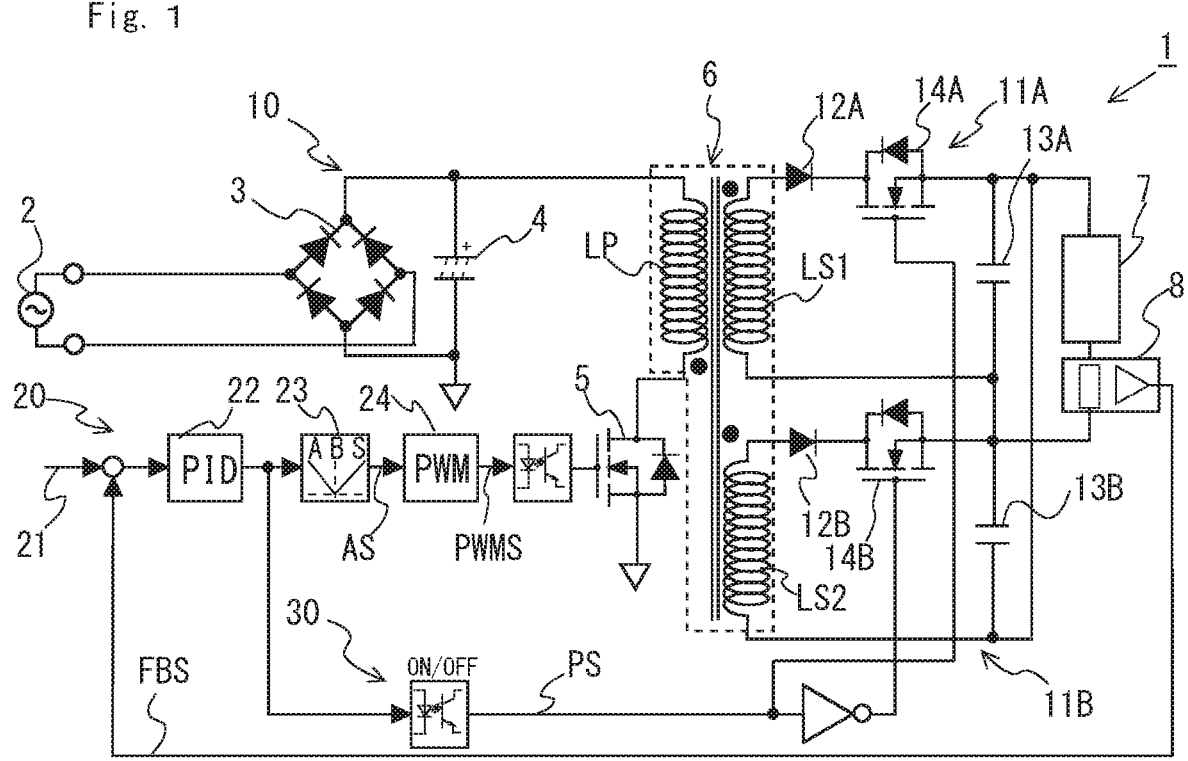
FIG. 1 is a circuit diagram illustrating the schematic configuration of a bipolar current control drive circuit according to a first example of the present invention.

In the present invention, a bipolar current control drive circuit for an inductive load includes a switching power supply circuit and a control circuit.

The switching power supply circuit has a rectifier bridge diode configured to rectify an alternating current from a power supply, a primary smoothing capacitor configured to smooth a rectified direct current, a switching transformer configured to transform a pulse wave alternating current at a predetermined alternating voltage and transmit the pulse wave alternating current to a secondary side, the pulse wave alternating current being converted from the direct current smoothed at the primary smoothing capacitor by switching between closing and opening of a primary switching element in a period based on a pulse signal from a pulse signal generator, a secondary diode configured to rectify the alternating current transmitted to the secondary side, and a secondary smoothing capacitor configured to further smooth the rectified direct current and output the rectified direct current that is smoothed to an inductive load.

The control circuit is configured to adjust a pulse duration of a pulse signal from the pulse signal generator based on a command signal and a detected result on an output side of the switching power supply circuit and control switching between closing and opening of the switching element.

The switching transformer includes one primary coil and two secondary coils that are a first secondary coil and a second secondary coil for the one primary coil.

A first secondary circuit and a second secondary circuit are provided, the first secondary circuit is configured to output, to the inductive load, a direct current resulted from an alternating current from the first secondary coil, the alternating current having been rectified at a first secondary diode and smoothed at a first secondary smoothing capacitor, the second secondary circuit is configured to output, to the inductive load in a reverse orientation to an output orientation of the first secondary circuit, a direct current resulted from an alternating current from the second secondary coil, the alternating current having been rectified at a second secondary diode and smoothed at a second secondary smoothing capacitor.

On the first secondary circuit and the second secondary circuit, a first secondary switching element and a second secondary switching element are respectively placed.

The control circuit further has a polarity control circuit configured to control switching between closing and opening of the first secondary switching element and the second secondary switching element using a polarity signal based on the command signal and control a polarity of an electric current by selectably outputting, to the inductive load, an electric current from the first secondary circuit and an electric current from the second secondary circuit.

With the configuration, in the present invention, the voltage of the load is not directly subjected to switching control. After a voltage from the power supply is subjected to switching control at a high frequency based on the command signal from the control circuit on the primary side of the switching power supply circuit, alternating-current power is delivered to the secondary side, and the power is rectified, smoothed, and then outputted to the inductive load. Thus, a drive voltage with no switching is supplied to the inductive load, and only a voltage change necessary for the operation of the load occurs. Therefore, no voltage change occurs under the conditions in which the load current is constant, no change occurs in the magnetic field unlike a change in the magnetic field in PWM control with a conventional H-bridge configuration, and no inductive and charge current is generated. Thus, neither losses nor noise occur. With this configuration, in the case in which sensors are provided around the inductive load, the sensors are not adversely affected by noise. Thus, sensor accuracy is not degraded, and this enables highly accurate control.

The secondary voltage of the transformer is determined by wire turns of the primary side and the secondary side. Thus, in accordance with the present invention, the maximum applied voltage to the inductive load is obtained regardless of the original power supply voltage. The applied voltage to the inductive load is increased to a high voltage with no increase in noise and losses, and this also enables the accelerated operation of the load.

In the present invention, the polarity of the electric current supplied to the inductive load is switched by switching between closing and opening of the first secondary switching element of the first secondary circuit and the second secondary switching element of the second secondary circuit. Therefore, the main components which perform bipolar current control in the drive circuit of the inductive load are accomplished by the form that one shared element on the secondary side which determines the amplitude for two elements which determine polarities on the secondary side.

At the time point at which the switching elements are switched, theoretically, little electric power is delivered to the secondary side. Thus, the electric current carried between the elements is also considerably small, the current is absorbed into the capacitance provided on the circuit, and hence a voltage that might break the elements is not generated. Consequently, there is no risk of a large current short circuit unlike a drive circuit configuration using an H-bridge circuit. It is unnecessary to prevent the first and the second secondary switching elements that determine polarities from being closed at the same time, and a circuit for prevention is not required. Accordingly, the circuit configuration as a whole is simpler than a conventional configuration using H-bridge.

As described above, the bipolar current control drive circuit for an inductive circuit according to the present invention has a simple circuit configuration without adopting any H-bridge configuration, and at the same time, the bipolar current control drive circuit enables more efficient bipolar current control of the inductive load with losses and noise reduced.

Note that, the bipolar current the drive circuit according to the present invention may switch between the polarities of the electric current supplied to one inductive load as well as the circuit may supply electric currents having different polarities individually to two inductive loads whose driving directions are opposed to each other.

In this case, the application is not necessarily limited to a single inductive load device. A configuration is possible in which electric currents are individually supplied from the first secondary circuit and the second secondary circuit to a first inductive load and a second inductive load. With this configuration, switching between the drive unit of the first inductive load and the drive unit of the second inductive load can be efficiently controlled.

For example, such switching drive of the first and the second inductive loads is effective for controlling opposite driving of the same drive units in a single device, such as a directional control valve and a solenoid operated control valve that has a double solenoid configuration used for a flow rate control valve. In this case, electric currents supplied from the secondary circuits to a pair of solenoids that are a first inductive load and a second inductive load are controlled, and hence switching the drive between the opposing directions can be efficiently controlled. As described above, also in opposite driving of two inductive loads, the bipolar current control drive circuit according to the present invention enables more efficient control with a simple circuit configuration with no loses and noise.

In the first and the second secondary circuits, the secondary switching elements simply close or open the first and the second secondary circuits in switching between electric currents supplied to the inductive load. Thus, similarly to a typical circuit, a so-called high-side switch configuration only has to be provided in which devices suitable for transient performance are appropriately selected as the secondary switching elements and are placed at the positions at which the line is connected and disconnected on the high voltage side of the power supply.

The bipolar current control drive circuit according to the present invention can also be configured of a low-side switch configuration in which the secondary switching elements are placed in the secondary circuits at positions at which the line is connected and disconnected on the low voltage side of the inductive load.

In the bipolar current control drive circuit according to the present invention, even through the first and the second secondary switching elements are closed at the same time, this causes no problem, because secondary electric power in switching is small as described above. Thus, with this advantage, a configuration is also possible in which electric currents to the inductive load are proportionally switched with the first secondary switching element overlapped with the second secondary switching element. In this case, losses of the secondary switching elements are also small. In this case, the polarity control circuit of the control circuit is formed for use in a proportional switching configuration. Electric currents are switched by controlling the degrees of opening of the first and the second secondary switching elements proportional to a control deviation in inversely proportional relationship. Thus, the positive and negative polarities can be changed with no switch operation.

In the present invention, for the configuration of the secondary circuit, a flyback converter configuration is convenient in which the polarities of the secondary coils are set in the reverse direction to the primary coil. However, a forward converter configuration may be possible in which the polarities of the secondary coils are set the same as the polarity of the primary coil and a choke coil and a commutation diode are included.

In the flyback converter configuration, even though an electric current is carried through the primary coil with the primary side closed, no inductive current is carried through the secondary coil. Energy is stored on the core through the generated magnetic flux. After the primary side is opened, energy stored on the core is released, and an electric current is carried through the secondary diode. In the forward converter configuration, when an electric current is carried through the primary coil with the primary side closed, induced electromotive force is generated on the secondary coil, and an electric current is carried through the secondary diode. However, energy is stored on the choke coil. When the primary side is opened, electromotive force is generated on the choke coil, the stored energy is released, and an electric current is carried through the commutation diode.

Example 1

As a bipolar current control drive circuit for an inductive load according to an example of the present invention, FIG. 1 is a circuit diagram in the case in which a secondary switching circuit has a high-side switch configuration. A bipolar current control drive circuit 1 for an inductive load according to the example has a switching power supply circuit 10, as a basic configuration, including a switching transformer. The polarity of an electric current is determined on the secondary side. That is, the switching power supply circuit 10 includes a bridge diode 3 that rectifies an alternating current from a power supply 2, a primary smoothing capacitor 4 that smooths the rectified direct current, a primary switching element (MOSFET) 5 that converts the direct current smoothed at the primary smoothing capacitor 4 into a pulse wave alternating current by switching between closing and opening in a period based on a pulse signal generated at a pulse signal generator 24 in a control circuit 20, and a switching transformer 6 that transforms the pulse wave alternating current at a predetermined voltage and transmits the alternating current from a primary coil LP to secondary coils. The alternating current transmitted to the secondary side is rectified at a secondary rectifier diode, further smoothed at a secondary smoothing capacitor, and delivered as a direct current to an inductive load 7.

In the example, the switching transformer 6 includes one primary coil (LP) and two secondary coils (a first secondary coil LS1 and a second secondary coil LS2) having different coil polarities for the primary coil. In the circuit configuration on the secondary side, the directions of the currents supplied from the two secondary coils (LS1 and LS2) to the inductive load 7 are reversed to each other. That is, the first secondary coil LS1 is connected forward to the inductive load 7 through a first secondary circuit 11A, and the second secondary coil LS2 is connected backward to the inductive load 7 through a second secondary circuit 11B.

The first secondary circuit 11A includes a first secondary diode 12A that rectifies the alternating current transmitted from the primary coil LP to the first secondary coil LS1, and a first secondary smoothing capacitor 13A that further smooths the rectified direct current and delivers the current to the inductive load 7. Similarly, the second secondary circuit 11B includes a second secondary diode 12B that rectifies the alternating current transmitted to the second secondary coil LS2 and a second secondary smoothing capacitor 13B that further smooths the rectified direct current.

The first and the second secondary circuits (11A and 11B) have a so-called high-side switch configuration in which switching elements (a first secondary switching element 14A and a second secondary switching element 14B) formed of MOSFETs, for example, are placed at positions at which the line is connected to and disconnected from the inductive load 7 on the high voltage side.

In the control circuit 20, an actual manipulated variable is determined through a proportional integral differential (PID) control unit 22 on the basis of a deviation from a target value, the deviation is based on a current command signal 21 and a current feedback signal FBS from the detected result at a current sensor 8 on the output side. An amplitude signal AS corresponding to the manipulated variable is generated at an amplitude determining unit 23, and the amplitude signal AS is outputted to the pulse signal generator 24. The pulse signal generator 24 controls switching between closing and opening of the primary switching element 5 using a pulse signal PWMS based on the amplitude signal AS, and hence the primary side of the switching transformer 6 is subjected to PWM control.

The control circuit 20 is provided with a polarity control circuit 30 that controls switching between closing and opening of the first secondary switching element 14A and the second secondary switching element 14B using a polarity signal PS based on the current command signal 21. This switches between current supply from the first secondary coil LS1 to the inductive load 7 through the first secondary circuit 11A and current supply from the second secondary coil LS2 through the second secondary circuit 11B, and the orientation of the electric current is reversed. When the inductive load 7 is a motor, the rotation direction is switched between the forward and the backward directions. When the inductive load 7 is a solenoid and a linear motor, the driving direction is switched between the onward direction and the return direction.

In the example having the configurations described above, switching control based on PWM is performed on the primary side. Thus, a rectified, smoothed voltage is supplied to the inductive load 7 with no switching. That is, since only a change in the voltage necessary for the operation of the inductive load is generated, a change in the magnetic field and a change in the voltage, which cause a large loss and noise, do not occur. In addition to this, since number of turns of the primary side and the secondary side of the transformer determine the secondary voltage, the voltage applied to the inductive load can also be increased to accelerate the operation of the load with no dependence on the power supply voltage.

The bipolar current control drive circuit 1 according to the example accomplishes the configuration for bipolar current control with the configuration of one primary switching element 5 that determines the amplitude and the first and the second secondary switching elements (14A and 14B) that determine polarities for the primary switching element 5. At the time point at which the first and the second secondary switching elements (14A and 14B) are switched, theoretically, little electric power is delivered to the secondary side of the transformer. Thus, even though the first and the second secondary switching elements (14A and 14B) are closed at the same time, this causes no problem, and there is no necessity to provide a circuit that prevents from the switching elements being closed at the same time. Therefore, the bipolar current control drive circuit 1 according to the example has a simple circuit configuration, and at the same time, and efficient bipolar drive control of an inductive load is enabled more than ever before with noise and losses excellently reduced.

Example 2

Figure 2:
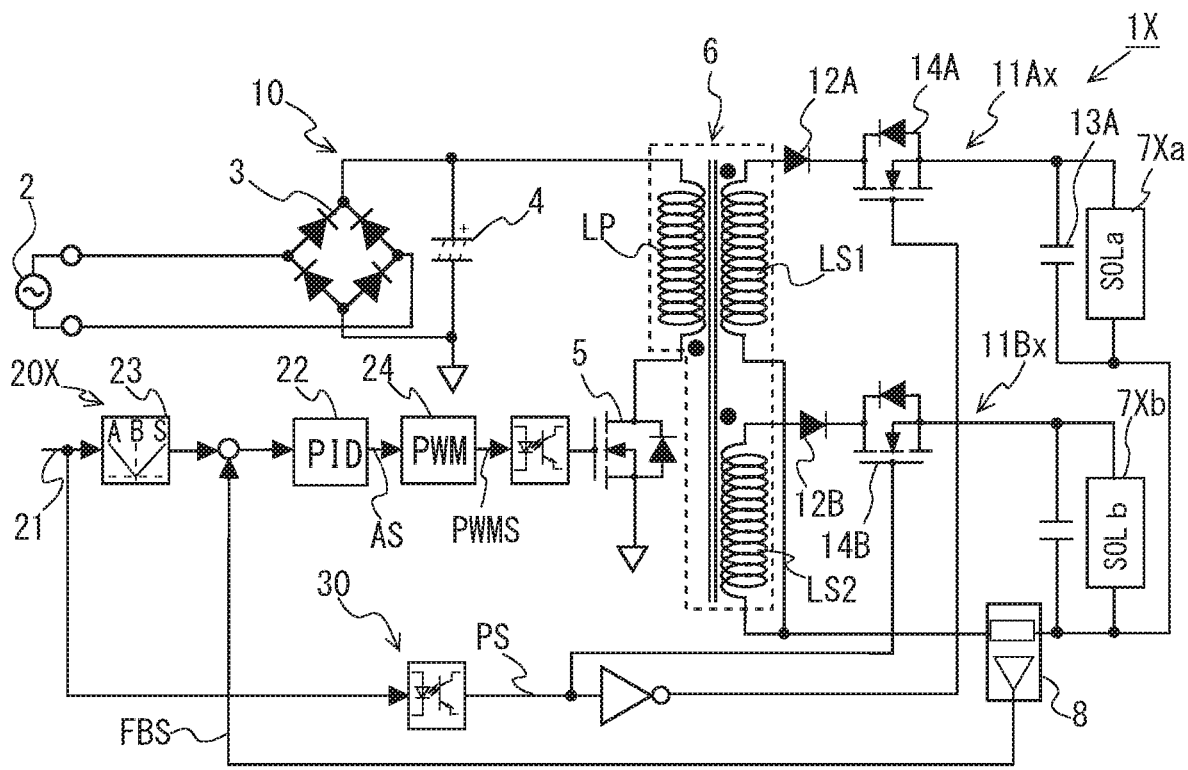
FIG. 2 is a circuit diagram illustrating the schematic configuration of a bipolar current control drive circuit according to a second example of the present invention for a double solenoid.

In the first example, the case is shown in which the polarity is controlled for one inductive load. However, the bipolar current control drive circuit according to the present invention is effective for efficiently controlling switching drive of a pair of inductive loads driven in the opposite directions. As a second example of the present invention, FIG. 2 is a bipolar current control drive circuit for opposite drive in double solenoid of a solenoid operated control valve, for example.

In the example, the inductive load is a pair of solenoids. The main circuit configuration other than the connecting parts between the first secondary circuit and the second secondary circuit to the inductive load is similar to the configuration of the first example illustrated in FIG. 1. Note that, in FIG. 2, components the same as the components in FIG. 1 are designated the same reference signs.

A bipolar current control drive circuit 1X for an inductive load according to the example is provided with a switching power supply circuit 10, as a basic configuration, including a switching transformer the same as the switching transformer of the first example. The polarity of the electric current is selected on the secondary side. That is, the switching power supply circuit 10 includes a bridge diode 3 that rectifies an alternating current from a power supply 2, a primary smoothing capacitor 4 that smooths the rectified direct current, a primary switching element (MOSFET) 5 that converts the direct current smoothed at the primary smoothing capacitor 4 into a pulse wave alternating current by switching between closing and opening in a period based on a pulse signal generated at a pulse signal generator 24 in a control circuit 20X, and a switching transformer 6 that transforms the pulse wave alternating current at a predetermined voltage and transmits the alternating current from a primary coil LP to secondary coils.

Switching of the transmission from the primary side to the secondary side, i.e. to a first secondary coil LS1 or a second secondary coil LS2 is controlled in response to a signal from a polarity control circuit 30 of the control circuit 20X. In the example, the first secondary coil LS1 is connected to a first solenoid 7Xa that is one of a pair of solenoids through a first secondary circuit 11Ax, and the second secondary coil LS2 is connected to a second solenoid 7Xb that is the other of the pair of solenoids through a second secondary circuit 11Bx. In the circuit configuration, the directions of currents supplied from the secondary coils (LS1 and LS2) to the first solenoid 7Xa and the second solenoid 7Xb are in the reverse orientations. In the control circuit 20X according to the example, an amplitude determining unit 23 first generates an amplitude signal corresponding to the manipulated variable to be a target for the one solenoid to be driven of the two solenoids based on a current command signal 21. An amplitude signal AS corresponding to the actual manipulated variable is determined through a PID control unit 22 on the basis of a deviation from a target value based on a current feedback signal FBS from the detected result on the output side at a current sensor 8, and the amplitude signal AS is outputted to the pulse signal generator 24.

Here, for example, a configuration is assumed in which the first solenoid 7Xa is placed at a position at which its moving core is in contact with one end of the spool of the solenoid operated control valve, and the second solenoid 7Xb is placed at the position at which its moving core is in contact with the other end of the spool.

In this case, closing a first secondary switching element 14A in response to a polarity signal PS from the polarity control circuit 30 will carry a current through the first solenoid 7Xa through the first secondary circuit 11Ax, the moving core of the first solenoid 7Xa is driven in one direction for a predetermined period, accordingly one end of the spool is pressed, and a valve state is obtained in which a predetermined port connection is achieved by the movement of the spool. Then, opening the first secondary switching element 14A and closing the second secondary switching element 14B in response to the polarity signal PS from the polarity control circuit 30, will carry no current through the first solenoid 7Xa and will carry a current through the second solenoid 7Xb, the moving core of the second solenoid 7Xb is driven for a predetermined period in the direction opposite to the direction in which the moving core of the first solenoid 7Xa is driven. Accordingly the other end of the spool is pressed, the spool is pushed back in the opposite direction, and the valve state is switched to another valve state in which a predetermined different port connection is achieved.

As described above, also in switching control of the directions of a mechanism including a pair of inductive loads (solenoids) driven in the opposite directions in one device, the bipolar current control drive circuit 1X according to the example enables efficient control with noise and losses excellently reduced.

Example 3

Figure 3:
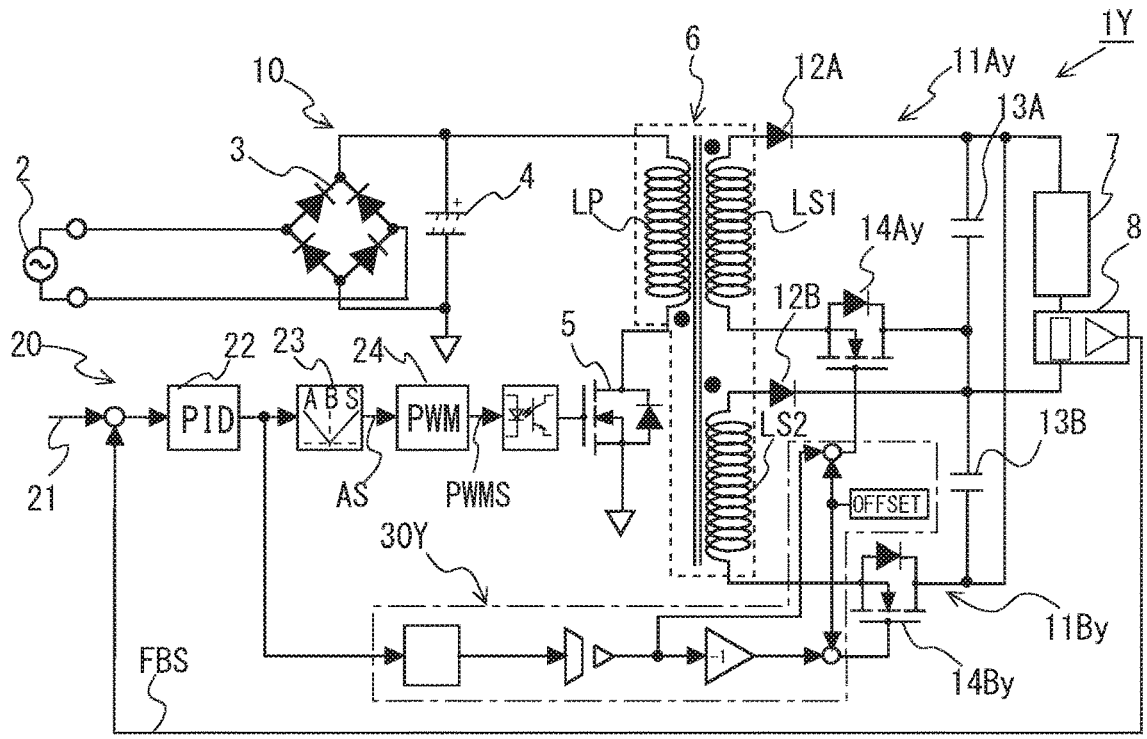
FIG. 3 is a circuit diagram illustrating the schematic configuration of a bipolar current control drive circuit according to a third example of the present invention.

As a third example of the present invention, FIG. 3 is a schematic circuit diagram in the case in which the first and the second secondary switching elements of the secondary circuits are placed on the low side of the inductive load. The secondary circuits of the first and the second examples described above have a high-side switch configuration in which the first and the second secondary switching elements (14A and 14B) are placed on the high voltage side of the inductive load 7. However, in the bipolar current control drive circuit according to the present invention, the secondary electric power delivered in the switching operation of two secondary switching elements that determine polarities is considerably small, and this causes no problem even though the switching elements are closed at the same time. Thus, in the example, a configuration is provided in which a first secondary switching element (14Ay) is overlapped with a second secondary switching element (14By) for proportional control.

The example has the configuration similar to the configuration illustrated in FIG. 1 of the first example except that the first and the second secondary switching elements are placed on the low side in a first secondary circuit and a second secondary circuit and a polarity control circuit 30Y is a proportional switching circuit. Note that, in FIG. 3, components the same as the components in FIG. 1 are designated the same reference signs.

Similarly to the first example, a bipolar current control drive circuit 1Y for an inductive load according to the example is provided with a switching power supply circuit 10, as a basic configuration, including a switching transformer. The polarity of the electric current is determined on the secondary side. That is, the switching power supply circuit 10 includes a bridge diode 3 that rectifies an alternating current from a power supply 2, a primary smoothing capacitor 4 that smooths the rectified direct current, a primary switching element (MOSFET) 5 that converts the direct current smoothed at the primary smoothing capacitor 4 into a pulse wave alternating current by switching between closing and opening in a period based on a pulse signal generated at a pulse signal generator 24 in a control circuit 20, and a switching transformer 6 that transforms the pulse wave alternating current at a predetermined voltage and transmits the alternating current from a primary coil LP to secondary coils. The alternating current transmitted to the secondary side is rectified at a secondary rectifier diode, further smoothed at a secondary smoothing capacitor, and delivered as a direct current to an inductive load 7.

Similarly to the first example, on the secondary side of the switching transformer 6, a first secondary coil LS1 is connected forward to the inductive load 7 through a first secondary circuit 11Ay and a second secondary coil LS2 is connected backward to the inductive load 7 through a second secondary circuit 11By in such a manner that the directions of the currents supplied from the first secondary coil LS1 and the second secondary coil LS2 to the inductive load 7 are reversed to each other.

Similarly to the first example, in the control circuit 20, an actual manipulated variable is determined through a PID control unit 22 on the basis of a deviation from a target value, the deviation is based on a current command signal 21 and a current feedback signal FBS from the detected result at a current sensor 8 on the output side. An amplitude signal AS corresponding to the manipulated variable is generated at an amplitude determining unit 23, and the amplitude signal AS is outputted to the pulse signal generator 24. The pulse signal generator 24 controls switching between closing and opening of the primary switching element 5 using a pulse signal PWMS based on the amplitude signal AS, and hence the primary side of the switching transformer 6 is subjected to PWM control.

Note that, on the secondary side of the example, in the first and the second secondary circuits (11Ay and 11By), the first and the second secondary switching elements (14Ay and 14By) are placed on the low voltage side of the inductive load 7. The switching of current supply to the inductive load is proportionally controlled in response to the output signal from the polarity control circuit 30Y based on the current command signal 21. That is, the polarity control circuit 30Y performs electric current switching by controlling the degrees of opening of the first and the second secondary switching elements (14Ay and 14By) proportional to a control deviation in inversely proportional relationship. The polarity control circuit 30Y can change the positive and negative polarities of the electric current with no switch operation. In this case, in the overlap in closing the secondary switching elements at the same time, even though an electric current is carried through the first and the second secondary switching elements (14Ay and 14By), the amount of the electric current is considerably small, and losses are also small.

Example 4

In the first to the third examples described above, the case is shown in which the bipolar current control drive circuit has a flyback converter configuration in which the polarities of the secondary coils (LS1 and LS2) are reverse directions to the primary coil LP of the switching transformer 6. However, the bipolar current control drive circuit according to the present invention can also have a forward converter configuration in which the polarity of the primary coil is the same as the polarities of the secondary coils.

Figure 4:
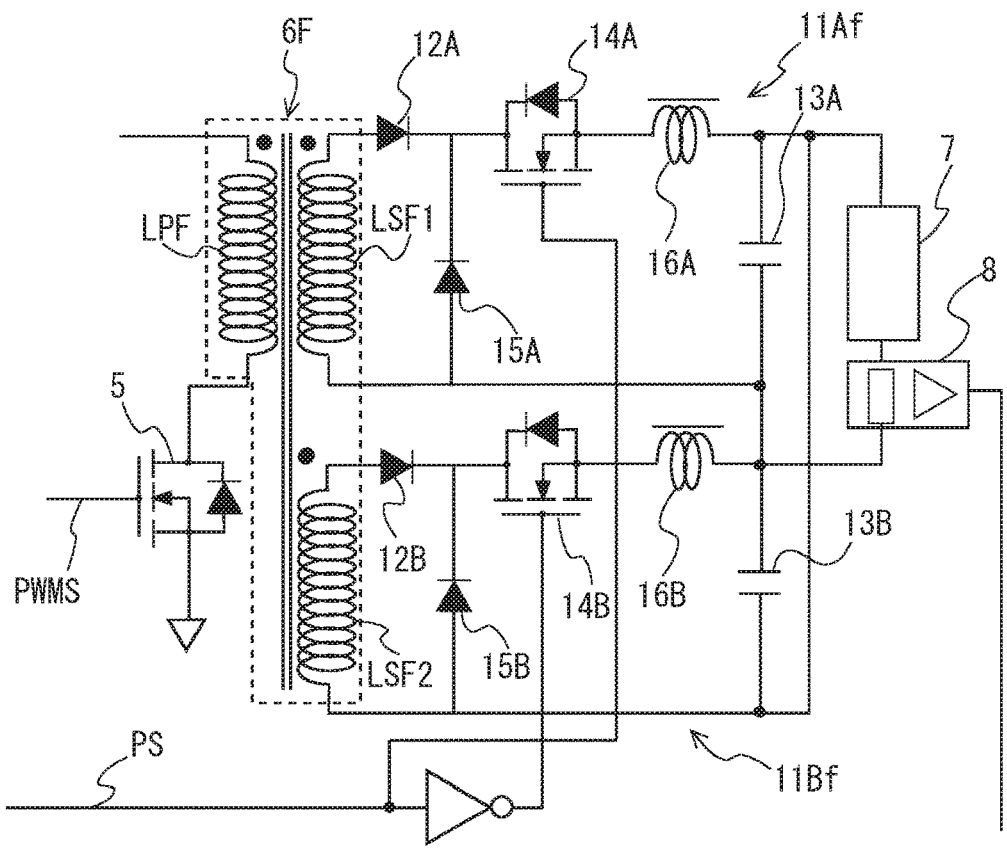
FIG. 4 is a partial circuit diagram of a bipolar current control drive circuit according to a fourth example of the present invention, showing a secondary circuit configuration from a switching transformer.

As a fourth example of the present invention, FIG. 4 is a partial circuit diagram of a bipolar current control drive circuit in a forward converter configuration. In the example of the forward converter configuration, the circuit configuration and the control circuit on the primary side are the same as the first example. In FIG. 4, the configuration on the primary side is omitted. FIG. 4 mainly illustrates the circuit configuration on the secondary side from a switching transformer. Note that, in FIG. 4, components the same as the components of FIG. 1 are designated the same reference signs.

The secondary side of the example also has a configuration the same as the configuration of the first example, except that secondary circuits have a forward converter configuration. That is, a switching transformer 6F includes one primary coil LPF and two secondary coils which are a first secondary coil and a second secondary coil (LSF1 and LSF2) for the primary coil LPF, and these coils have the same polarities. The first secondary coil LSF1 is connected forward to an inductive load 7 through a first secondary circuit 11Af. The second secondary coil LSF2 is connected backward to the inductive load 7 through a second secondary circuit 11Bf. With this configuration, the directions of the currents supplied from the first secondary coil LSF1 and the second secondary coil LSF2 to the inductive load 7 are reversed to each other.

In the first secondary circuit 11Af, an alternating current from the first secondary coil LSF1 is rectified at a first secondary diode 12A, the rectified current is smoothed at a first secondary smoothing capacitor 13A, and the current is delivered as the smoothed direct current to the inductive load 7. Similarly, in the second secondary circuit 11Bf, an alternating current from the second secondary coil LSF2 is rectified at a second secondary diode 12B, the rectified current is smoothed at a second secondary smoothing capacitor 13B, and the current is delivered as the smoothed direct current to the inductive load 7. On the first and the second secondary circuits (11Af and 11Bf), a first secondary switching element and a second secondary switching element (14A and 14B) are respectively placed on the high voltage side (the high side) of the inductive load 7. Closing and opening of the first and the second secondary switching elements (14A and 14B) are switched in response to a polarity signal PS from a polarity control circuit 30, and electric current switching is controlled.

In the example, the first and the second secondary circuits (11Af and 11Bf) respectively include a first commutation diode and a second commutation diode (15A and 15B) and a first choke coil and a second choke coil (16A and 16B). The first and the second secondary circuits (11Af and 11Bf) have a forward converter configuration. In the forward converter configuration, carrying an electric current through the primary coil LPF with the primary side closed will generate induced electromotive force on the secondary coils (LSF1 and LSF2), an electric current is carried through the secondary diodes (12A and 12B), and energy is stored on the choke coils (16A and 16B). Then, opening the primary side will generate electromotive force on the choke coils (16A and 16B) to release the stored energy, and an electric current is carried through the commutation diodes (15A and 15B).

As described in the example, the bipolar current control drive circuit for an inductive load according to the present invention can also have a forward converter configuration as well as a flyback converter configuration.

The bipolar current control drive circuit for an inductive load according to the present invention can place the switching elements for polarity switching in a high-side switch configuration as well as in a proportional switching configuration in which the switching elements are placed on the low side. Therefore, the bipolar current control drive circuit has a high degree of freedom of selection when its configuration is determined suitable for its application. In addition to this, with any configuration, the voltage of the load itself is not switched, and a rectified, smoothed voltage is supplied to the inductive load. Thus, noise and losses are excellently reduced, and more efficient control of the polarity of the electric current can be performed over the inductive load, compared with previously existing H-bridge configurations.

REFERENCE SIGNS LIST 1, 1X, 1Y: bipolar current control drive circuit for an inductive load
2: power supply
3: bridge diode
4: primary smoothing capacitor
5: primary switching element
6, 6F: switching transformer
7: inductive load
7Xa: first solenoid
7Xb: second solenoid
8: current sensor
10: switching power supply circuit
LP, LPF: primary coil
LS1, LSF1: first secondary coil
LS2, LSF2: second secondary coil
11A, 11Ax, 11Ay, 11Af: first secondary circuit
11B, 11Bx, 11By, 11Bf: second secondary circuit
12A: first secondary diode
12B: second secondary diode
13A: first secondary smoothing capacitor
13B: second secondary smoothing capacitor
14A, 14Ay: first secondary switching element
14B, 14By: second secondary switching element
15A: first commutation diode
15B: second commutation diode
16A: first choke coil
16B: second choke coil
20, 20X: control circuit
21: current command signal
22: PID control unit
23: amplitude determining unit
24: pulse signal generator
30: polarity control circuit
30Y: polarity control circuit (proportional switching configuration)
FBS: current feedback signal
AS: amplitude signal
PWMS: pulse signal
PS: polarity signal

The invention claimed is:

1. A bipolar current control drive circuit for an inductive load comprising:
a switching power supply circuit having
a rectifier bridge diode configured to rectify an alternating current from a power supply,
a primary smoothing capacitor configured to smooth a rectified direct current,
a switching transformer configured to transform a pulse wave alternating current at a predetermined alternating voltage and transmit the pulse wave alternating current to a secondary side, the pulse wave alternating current being converted from the direct current smoothed at the primary smoothing capacitor by switching between closing and opening of a primary switching element in a period based on a pulse signal from a pulse signal generator,
a secondary diode configured to rectify the alternating current transmitted to the secondary side, and
a secondary smoothing capacitor configured to further smooth the rectified direct current and output the rectified direct current that is smoothed to an inductive load; and
a control circuit configured to adjust a pulse duration of a pulse signal from the pulse signal generator based on a command signal and a detected result on an output side of the switching power supply circuit and control switching between closing and opening of the switching element,
wherein: the switching transformer includes one primary coil and two secondary coils that are a first secondary coil and a second secondary coil for the primary coil;
a first secondary circuit and a second secondary circuit are provided, the first secondary circuit being configured to output, to the inductive load, a direct current resulted from an alternating current from the first secondary coil, the alternating current having been rectified at a first secondary diode and smoothed at a first secondary smoothing capacitor, the second secondary circuit being configured to output, to the inductive load in a reverse orientation to an output orientation of the first secondary circuit, a direct current resulted from an alternating current from the second secondary coil, the alternating current having been rectified at a second secondary diode and smoothed at a second secondary smoothing capacitor;
on the first secondary circuit and the second secondary circuit, a first secondary switching element and a second secondary switching element are respectively placed; and
the control circuit further has
a polarity control circuit configured to control switching between closing and opening of the first secondary switching element and the second secondary switching element using a polarity signal based on the command signal and control a polarity of an electric current by selectably outputting, to the inductive load, an electric current from the first secondary circuit and an electric current from the second secondary circuit.

2. The bipolar current control drive circuit for an inductive load according to claim 1,
wherein: the inductive load includes a first inductive load and a second inductive load having driving directions opposite to each other;
the first secondary circuit supplies an electric current to the first inductive load; and
the second secondary circuit supplies an electric current to the second inductive load.

3. The bipolar current control drive circuit for an inductive load according to claim 2,
wherein: the inductive load has a double solenoid configuration; and
the inductive load includes a pair of solenoids opposed to each other as the first inductive load and the second inductive load.

4. The bipolar current control drive circuit for an inductive load according to claim 1,
wherein the first secondary circuit and the second secondary circuit have a high-side switch configuration in which the first secondary switching element and the second secondary switching element are placed at positions at which a high-voltage side line on the power supply side is connected to and disconnected from the inductive load.

5. The bipolar current control drive circuit for an inductive load according to claim 1,
wherein the first secondary circuit and the second secondary circuit have a low-side switch configuration in which the first secondary switching element and the second secondary switching element are placed at positions at which a low-voltage side line is connected to and disconnected from the inductive load.

6. The bipolar current control drive circuit for an inductive load according to claim 1,
wherein the polarity control circuit has a proportional switching configuration in which electric current switching is performed by controlling a degree of opening of the first secondary switching element of the first secondary circuit and a degree of opening of the second secondary switching element of the second secondary circuit proportional to a control deviation in inversely proportional relationship.

* * * * *